United States Patent
Kling et al.

(10) Patent No.: US 6,883,089 B2
(45) Date of Patent: Apr. 19, 2005

(54) METHOD AND APPARATUS FOR PROCESSING A PREDICATED INSTRUCTION USING LIMITED PREDICATE SLIP

(75) Inventors: Ralph Kling, Sunnyvale, CA (US); Jeffrey D. Chamberlain, Tracy, CA (US); Perry H. Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 09/751,861

(22) Filed: Dec. 30, 2000

(65) Prior Publication Data

US 2002/0087847 A1 Jul. 4, 2002

(51) Int. Cl.$^7$ ................................ G06F 9/38
(52) U.S. Cl. .................. 712/216; 712/214; 712/217
(58) Field of Search ............................ 712/214, 216, 712/217

(56) References Cited

U.S. PATENT DOCUMENTS 6,513,109 B1 * 1/2003 Gschwind et al. .......... 712/200

OTHER PUBLICATIONS

Becker et al., "The PowerPC 601 Microprocessor", Micro, IEEE, vol. 13, iss. 5, Oct. 1993, pp. 54–68.*

Perry Wang, et al., *Register Renaming and Scheduling for Dynamic Execution of Predicated Code*, (electronic version) The Seventh IEEE International Symposium on High Performance Computer Architecture, Jan. 20–24, 2001, pp. 1–11, Monterrey, Mexico, IEEE Computer Society, ISBN 0–7695–1019–1.

* cited by examiner

*Primary Examiner*—William M. Treat
(74) *Attorney, Agent, or Firm*—Blakely, Sokoloff, Taylor & Zafman LLP (57) ABSTRACT

A system and method of processing a predicated instruction is disclosed. A consumer instruction and a predicated instruction are received in an reservation station of an out-order processor. The consumer instruction depends on a result of the predicated instruction. The predicated instruction is dispatched to an execution unit for execution. The executed predicate instruction is stored in a re-order buffer.

18 Claims, 12 Drawing Sheets

| INST# | | INSTRUCTION | DESCRIPTION |
|---|---|---|---|
| 1: | | mov 0 -> R1 | # establishes R1 |
| 2: | | ld (mem) -> R2 | # loads R2 from memory |
| 3: | | cmp 0, R2 -> P1 | # compares R2 to 0 and sets resulting predicate P1 |
| 4: | (P1) | add 5, R1 -> R1 | # adds 5 to R1 if P1 is true |
| 5: | | sub 10, R1 -> R3 | # sets R3 with the difference of 10 and R1 |

METHOD AND APPARATUS FOR PROCESSING A PREDICATED INSTRUCTION USING LIMITED PREDICATE SLIP

FIELD OF THE INVENTION

The present invention relates to computer systems and more specifically relates to microprocessors using predicated instructions.

BACKGROUND OF THE INVENTION

In modern processor designs, one method of increasing performance is executing multiple instructions per clock cycle. The performance of such processors is dependent on the amount of instruction level parallelism (ILP) exposed by the compiler and exploited by the processor. Therefore cooperation between compiler and processor is increasingly important to achieve higher performance.

One approach to approved cooperation between compiler and processor is using predicated instructions of a predicated execution processor. A predicated execution processor is a processor where an instruction is guarded by a Boolean operand whose value determines if the instruction is executed or nullified. To exploit ILP, a compiler can take full advantage of the predicated execution processor by applying a technique referred to as if-conversion. In short, if-conversion is an optimization that converts control flow dependence into data flow dependence. With if-conversion, the compiler can collapse multiple control flow paths and schedule them based only on data dependencies. Even though a predicated execution model exposes more ILP, such a predicated execution model may not always yield enhanced performance. On the compiler side, the predicated execution model requires a detailed analysis of the dynamic behavior of the code and the dynamic resource availability. Since the effectiveness of predication depends on resource availability, the scalability for and compatibility with future-generation processors are important issues to consider. Given the availability of increasing transistor budgets, increasingly more advanced microarchitecture mechanisms can be incorporated. Furthermore, the legacy base of predicated code should be able to continue to perform well on future processor generations.

One example of an advanced microarchitecture is that of a dynamic, or out-of-order, execution processor. An out-of-order, execution processor is, in general, more complex than a static execution processor. A static execution processor executes code in the order as scheduled statically by the compiler. An out-of order execution permits the processor to dynamically adjust instruction scheduling to the run-time behavior of the program. Because of this ability to adapt to the run-time environment, dynamic execution has been employed in many processor designs. The potential performance gains of an out of order execution model are facilitated by two techniques: Register renaming where registers are renamed to eliminate false dependencies and dynamic scheduling where instructions are reordered to reduce unnecessary stalls in the pipeline.

BRIEF DESCRIPTION OF THE DRAWINGS

The present invention is illustrated by way of example and not limitation in the figures of the accompanying drawings in which like references indicate similar elements.

DETAILED DESCRIPTION

A system and method of processing a predicated instruction is disclosed. A consumer instruction and a predicated instruction are received in a reservation station of an out-of-order processor. The consumer instruction depends on a result of the predicated instruction. The predicated instruction is dispatched to an execution unit for execution. The executed predicate instruction is stored in a re-order buffer.

Figure 1:
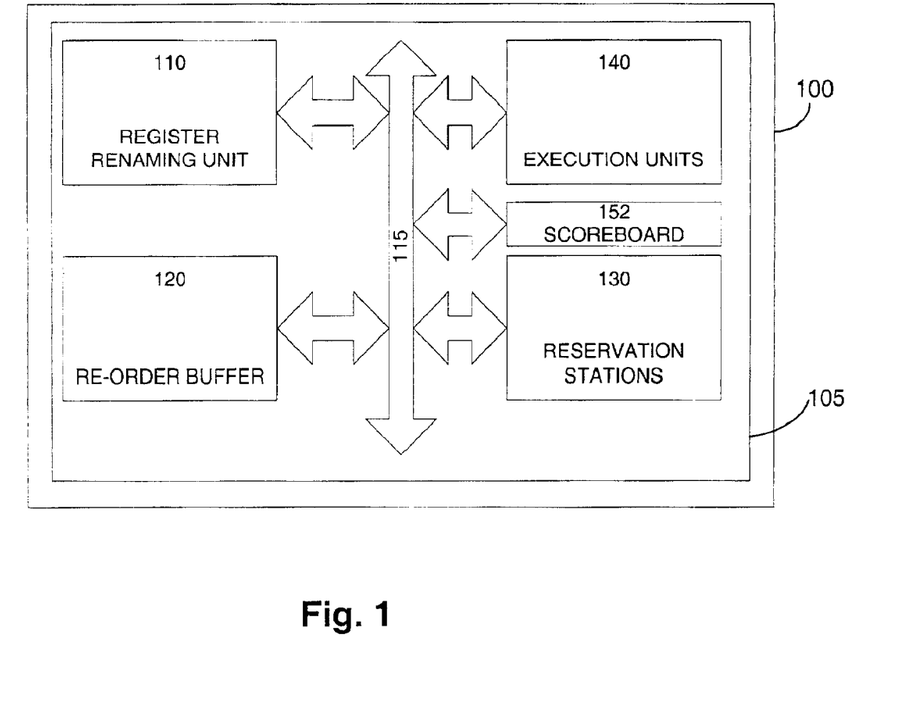
FIG. 1 illustrates a block diagram of a CPU of one embodiment.

There are several variations of out-of-order or dynamic execution processors. An out-of-order execution processor is shown in FIG. 1. The out-of-order execution processor includes a dynamic portion 105 of the processor 100 including a register-renaming unit 110, which maps between temporary and architectural files, a reorder buffer 120, a number of reservation stations 130, and a number of execution units 140. A bus 115 couples the register renaming unit 110, the reorder buffer 120, the reservation stations 130, the execution units 140, and a scoreboard 152 together and to the remaining portions of the processor that are not shown.

In a conventional in-order processor, there are three types of data dependencies: read after write (RAW), write after read (WAR), and write after write (WAW). Out-of-order (dynamic) scheduling attempts to reduce the stalls of the true or RAW dependencies, while register renaming eliminates the false dependencies, WAR and WAW.

Predication is used to transform a control dependency to a (true) data dependency, that is, the dependency between the write of predicate registers and the read of predicate registers for guarding instructions. However, predicate dependency is not truly a RAW dependency; predicate dependency has special properties. Unlike the roles of other source operands, the predicate does not contribute to the result of the instruction computation. However, the predicate dictates whether the result is to be committed.

One property of a predicate implies that the predicated instruction can still be executed regardless of the value of the predicate since predicate does not alter the outcome of the computation. Instead, the predicate determines whether the outcome is to be used or not used. Predicate slip provides performance improvement by taking full advantage of this property of the predicate dependency.

In principle, the predicate adds another input dependency to the first instruction. Unlike other data operands however, the predicate can only assume the "on" or "off" states. In general, an instruction in a processor can only be scheduled for execution after all of the instruction's inputs are resolved. In a simplistic implementation, a predicated instruction must be stalled until any predicates to the instruction are resolved.

A more sophisticated, in-order processor can issue a predicated instruction with an unresolved predicate. However, the predicated instruction must stall if the predicate is not resolved in the immediately following clock cycle. The stall prevents potentially incorrect data from being distributed by the bypass network. As soon as the predicate is resolved, the result of the instruction can either be distributed or discarded, as determined by the predicate, and the correctness of the data is guaranteed.

Figure 1A:
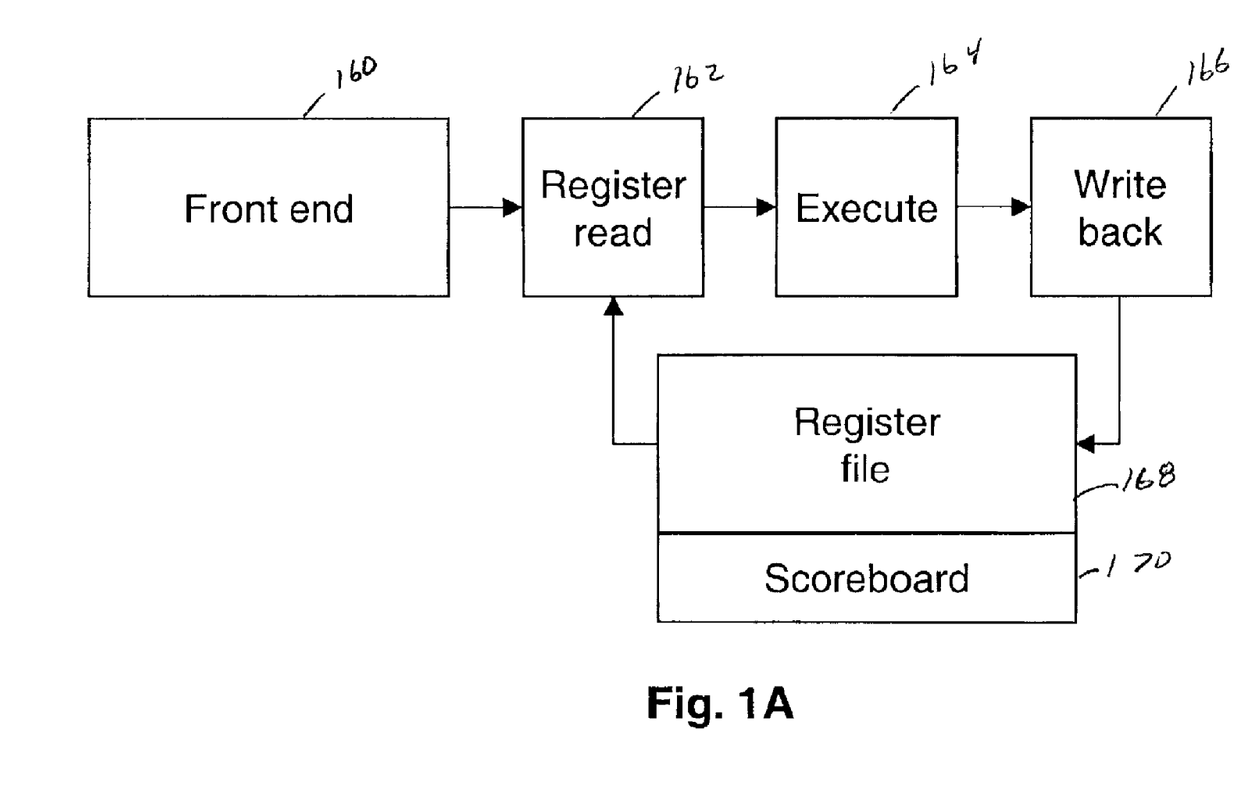
FIG. 1A shows one embodiment of an in-order conventional CPUI.

One embodiment of an in-order pipeline is shown in FIG. 1A. The front-end 160 fetches and decodes instructions. In the register read stage 162 the source operands are read from the register file 168. A scoreboard 170 indicates if the operands are ready. If any one of the source operands are not available the pipeline stalls. If an instruction is predicated (i.e. has a guarding predicate), the scoreboard 170 is checked next for the availability of the guarding predicate. If the guarding predicate is available, the guarding predicate is read from the register file 168 location containing the guarding predicate. If the guarding predicate is not available a simple machine would stall the pipeline. An enhanced machine of one embodiment could postpone stalling due to an unavailable guarding predicate until the completion of the execute stage 164. The execute stage 164 is the last chance of preventing a predicated-off result to be sent to following instructions via a result bypass network. In either case, a 'false' guarding predicate causes the result of the instruction to be discarded while a 'true' predicate allows the result to be written to the register file 168 in the write back stage 166.

Figure 1B:
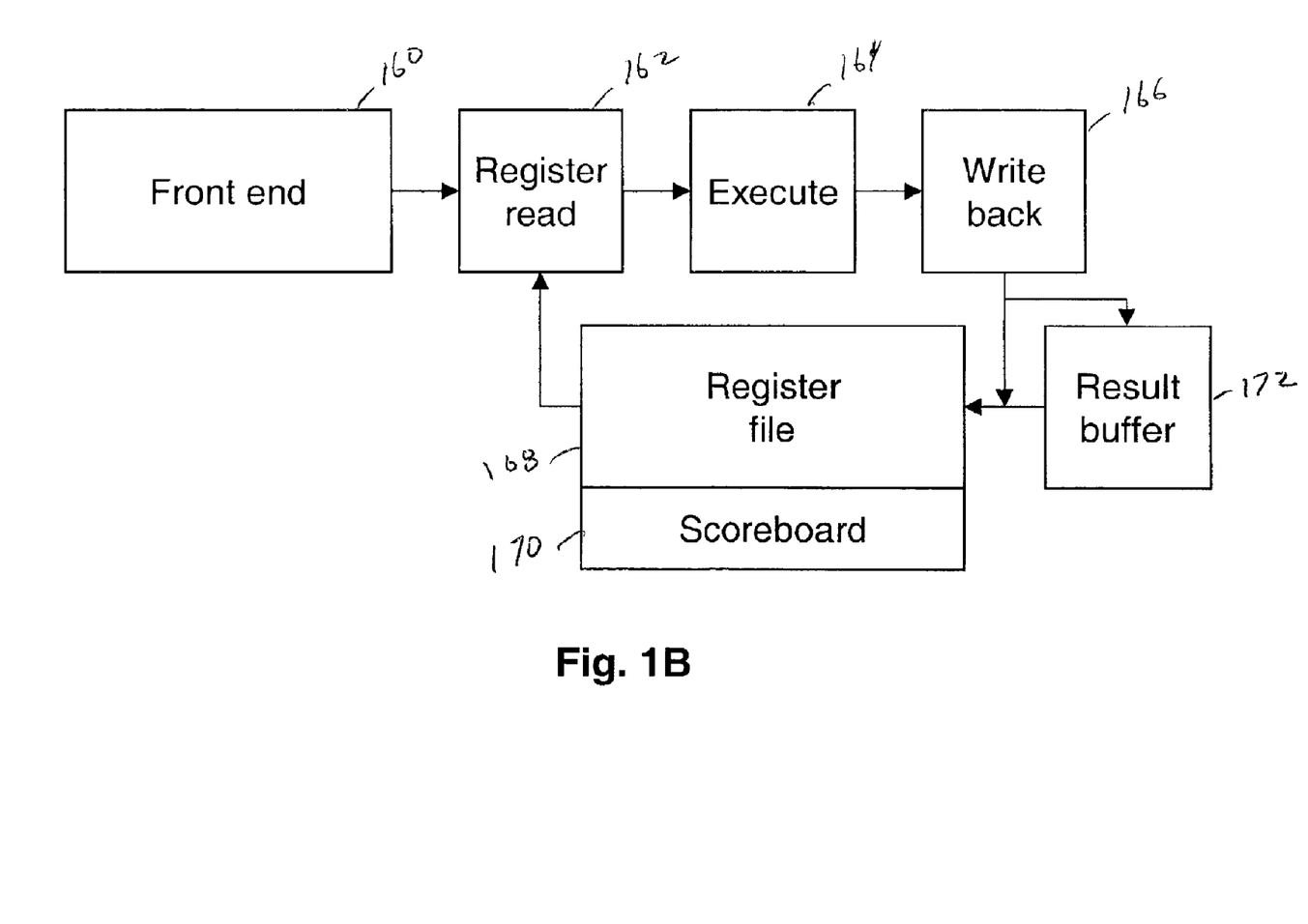
FIG. 1B illustrates an in-order limited predicate slip CPU of one embodiment.

One embodiment of an in-order pipeline with limited predicate slip is shown in FIG. 1B. The pipeline operates similar to the pipeline described above in FIG. 1A until the register read stage 162. In the register read stage 162 only source operand availability is checked. An unavailable guarding predicate does not stall execution. After execution, the result is written back to the register file 168, if the predicate is known and 'true'. The result is discarded if the predicate is known and 'false'. If the predicate is still unresolved the result is written back to a temporary result buffer 172 (associative buffer). This delays the update of the register file 168 until the predicate is resolved. The temporary result buffer 172 allows the pipeline to not stall due to an unavailable predicate in the cycle in which the register file 168 needs to be updated.

The illustrated pipelines of FIGS. 1A and 1B are exemplary only. More complex CPUs having multiple concurrent pipelines of varying lengths are also contemplated. An important issue to note is that the in-order pipeline issues instructions and resolves potential exceptions in-order. After that, the register file 168 can be updated out-of-order. The scoreboard 170 ensures that there are no out-of-order multiple writes to the same register. For an alternative embodiment with pipelines that must update the register file 168 in-order, for all pending register file writes following an unresolved predicate must be buffered in the temporary result buffer 172.

Figure 1C:
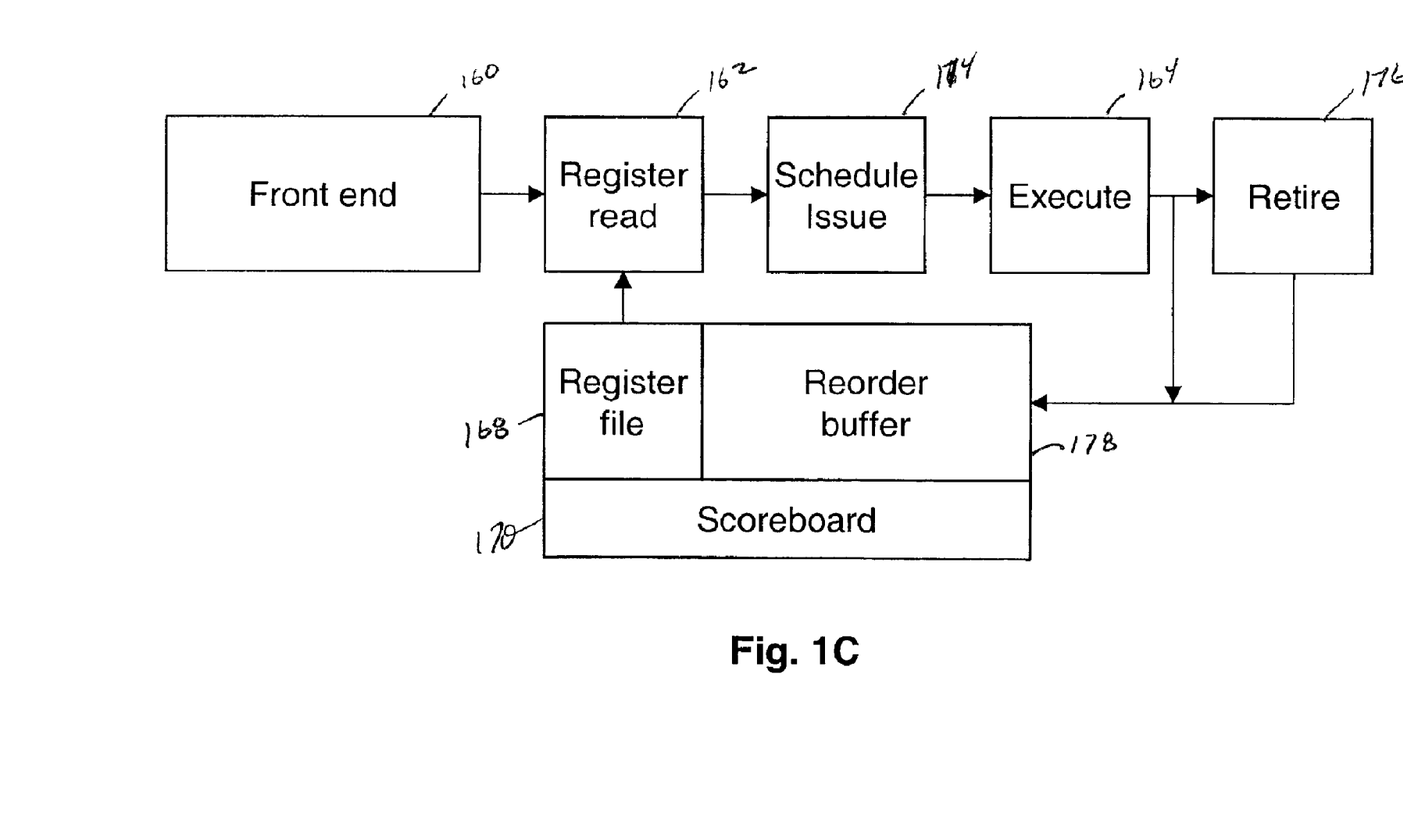
FIG. 1C shows an out-of-order CPU of one embodiment.

FIG. 1C shows a pipeline diagram of an out-of-order pipeline of one embodiment. The front-end 160 operates similar to that described in FIG. 1B in an in-order machine. The register read stage 162 obtains source operands from the register file 168, if available. The schedule/issue stage 174 decides when to execute an instruction. An instruction is executed when the scoreboard 170 indicates that the corresponding source operands are available. A conventional machine would regard the predicate as a source operand and prevent the schedule/issue stage 174 from issuing the instruction until the predicate is resolved and available. On embodiment of a limited slip pipeline ignores predicate availability at the schedule/issue stage 174. After execution, the results are written back to the reorder buffer 178. The reorder buffer 178 guarantees in-order updates of the architectural register file 168. In the limited predicate slip method, the reorder buffer 178 also assumes the functionality of the temporary result buffer 172 that was added in the in-order pipeline described in FIG. 1B above.

The retire stage 176 is responsible for moving results from the reorder buffer 178 into the register file 168 in-order. If a predicate is unresolved when its result is to be written back to the register file 168 all subsequent register file writes are stalled until the predicate is resolved. Note that this does not stall the main execution pipeline (i.e. stages 160–176) unless the reorder buffer 178 is completely filled up. As described in the in-order case above in FIGS. 1A and 1B, a 'false' predicate indicates that the result is to be discarded while a 'true' predicate causes the result to be written to the architectural register file.

It should be noted that the limited predicate slip method is not limited to the simple pipeline presented in the above example. More complex out-of-order pipelines that may contain register renaming, reservation stations and other enhancements are also contemplated. Separate reorder buffers and architectural register file are not required as long as the ordering of results becoming architecturally visible is maintained. Enhancements to the limited slip method depend on the pipeline structure and can also include early discarding of instructions with known 'false' guarding predicates to save execution bandwidth.

Figure 2:
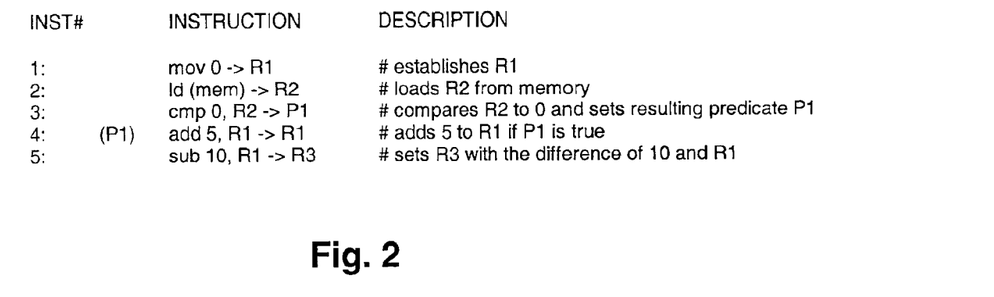
FIG. 2 shows a code sequence of one embodiment.

A code sequence of one embodiment is shown in FIG. 2. Instruction 1 sets the register R1. Instruction 2 loads R2 from memory and can potentially be a cache miss thus delaying the register write. Instruction 3 compares R2 with 0 and sets predicate P1. This can potentially be a multi-cycle operation in highly pipelined machines. Instruction 4 has a guarding predicate P1 that determines whether instruction 4 will write its result to the architectural registers. Instruction 5 depends on the outcome of instruction 4 and therefore indirectly on P1 as well.

If the predicate P1 is unavailable by the time instruction 4 is to be executed, the limited predicate slip algorithms, as described in more detail below, will delay a pipeline stall as long as possible. In the code example shown in FIG. 2 when instruction 5 needs to be executed, due to the dependence described above. Note that in real code there can be any number of unrelated instructions in between the ones shown (1–5). In summary, the following dependencies exist:

Instruction 3 depends on instruction 2 (R2 data dependency)

Instruction 4 depends on instruction 1 (R1 data dependency)

Instruction 4 depends on instruction 3 (P1 predicate dependency)

Instruction 5 depends indirectly on instruction 3:

If P1 is true, instruction 5 depends on instruction 4 (R1 data dependency)

If P1 is false, instruction 5 depends on instruction 1 (R1 data dependency)

Figure 3A:
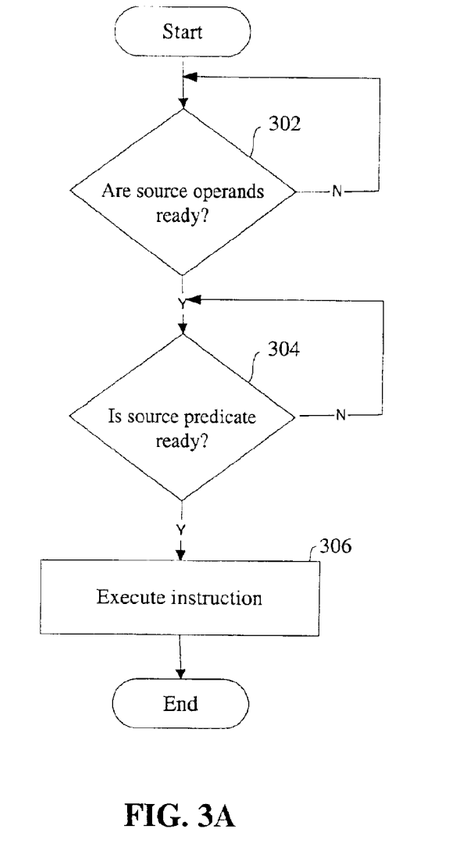
FIG. 3A shows a standard in-order CPU algorithm of one embodiment.

FIG. 3A shows the transition of an instruction from the register read stage to execution stage in a standard in-order CPU of one embodiment. For each instruction in the register read stage, the availability of the source operands of the instruction are checked in process block 302. Alternatively, the "oldest" instruction (i.e. the instruction that was issued to the register read stage first) is checked first and less aged instructions are checked in order of age. The scoreboard is queried to determine if the source operands are ready or available. If any one of the source operands are not available, then the pipeline is stalled until all of the source operands are available. If all of the source operands are available, then the source predicate is checked for availability in process block 304. The scoreboard can also track availability of the source predicate. If the source predicate is not available, then the pipeline must stall until the source predicate is available. Once the source predicate is available, then the instruction can be advanced to the execution stage in process block 306.

Figure 3B:
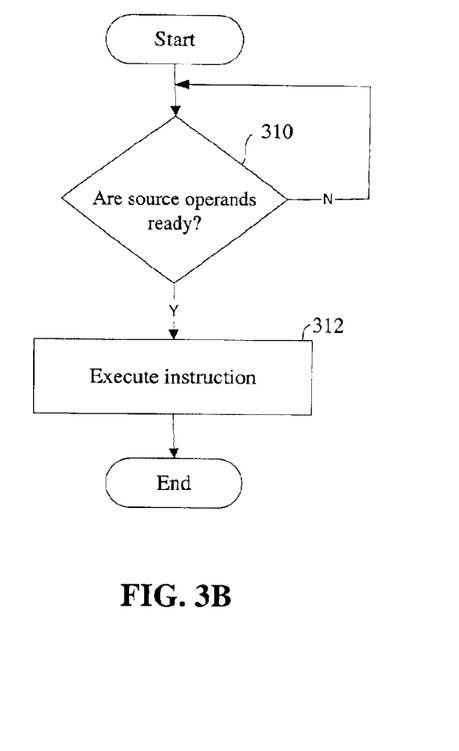
FIGS. 3B–3C show an enhanced in-order CPU algorithm of one embodiment.

FIG. 3B shows the transition of an instruction from the register read stage to execution stage in an enhanced in-order CPU of one embodiment. For each instruction in the register read stage, the availability of the source operands of the instruction are checked in process block 310. Alternatively, the "oldest" instruction (i.e. the instruction that was issued to the register read stage first) is checked first and less aged instructions are checked in order of age. The scoreboard is queried to determine if the source operands are ready or available. If any one of the source operands are not available, then the pipeline is stalled until all of the source operands are available. If all of the source operands are available, then the instruction can be advanced to the execution stage in process block 312.

Figure 3C:
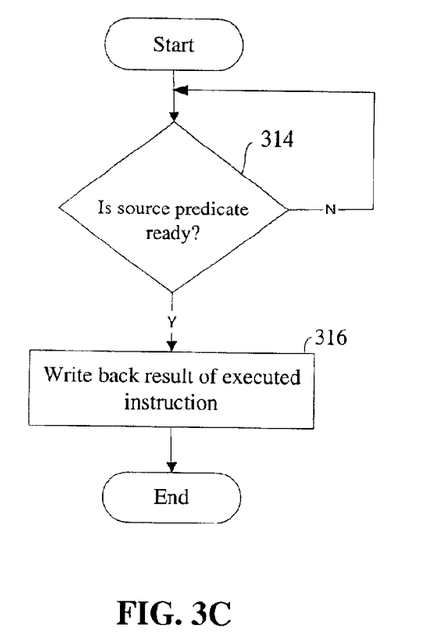

FIG. 3C shows the transition of an instruction from the execution stage to write back stage in an enhanced in-order CPU of one embodiment. For each instruction in the execution stage, the availability of the source predicate of the instruction are checked in process block 314. Alternatively, the "oldest" instruction (i.e. the instruction that was issued to the execution stage first) is checked first and less aged instructions are checked in order of age. The scoreboard is queried to determine if the source predicate is ready or available. If the source predicate is not available, then the pipeline is stalled until the source predicate is available. If the source predicate is available, then the instruction can be advanced to the write back stage in process block 316.

Figure 3D:
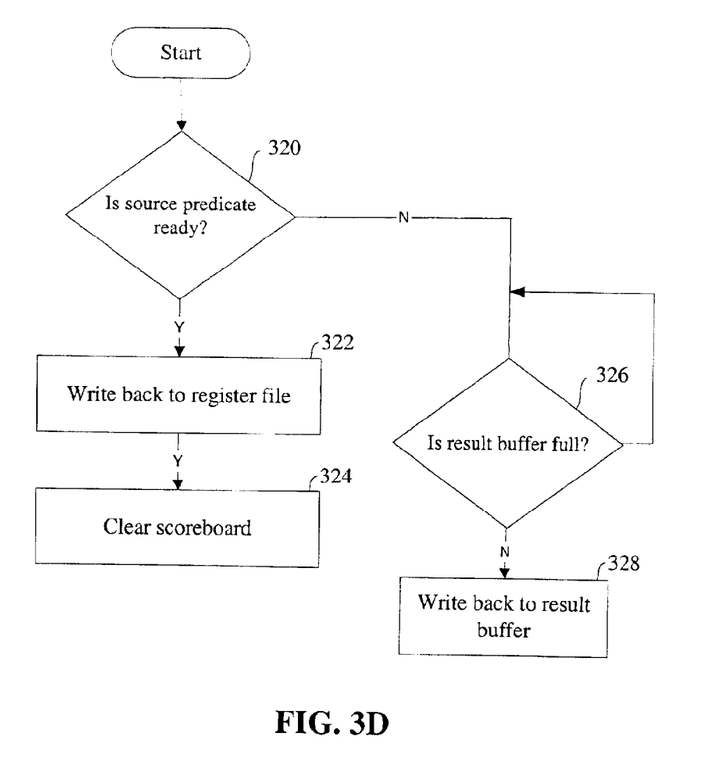
FIGS. 3D–3E illustrate a limited predicate slip in-order CPU algorithm (with temporary result buffer) of one embodiment.

For one embodiment of a limited predicate slip, in-order CPU, with a temporary result buffer, the transition of an instruction from the register read stage to execution stage is substantially similar to that described above in FIG. 3B. FIG. 3D shows the transition of an instruction from the execution stage to write back stage in a limited predicate slip, in-order CPU, with a temporary result buffer. For each instruction in the execution stage, the availability of the source predicate of the instruction are checked in process block 320. Alternatively, the "oldest" instruction (i.e. the instruction that was issued to the execution stage first) is checked first and less aged instructions are checked in order of age. The scoreboard is queried to determine if the source predicate is ready or available. If the source predicate is not available, then the result of the instruction is written back to the temporary result buffer in process block 328. Alternatively, the temporary result buffer can be checked to determine if the temporary result buffer is full, as shown in process block 326, before the result is written back to the temporary result buffer. If the source predicate is available in process block 320, then the instruction can be advanced to the write back stage in process block 322 and the scoreboard is cleared in process block 324.

Figure 3E:
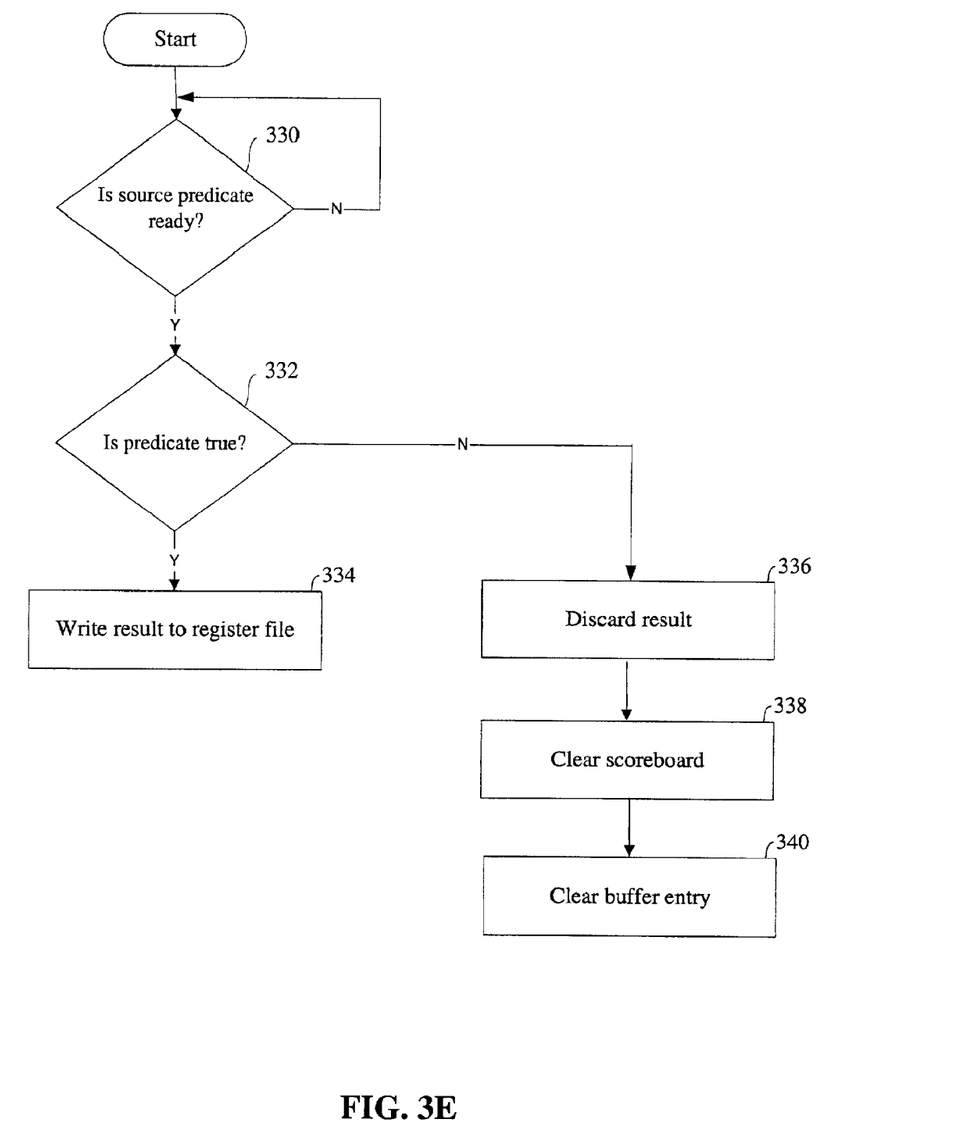

FIG. 3E shows the processing of an instruction in the temporary result buffer. For each instruction in the temporary result buffer, the availability of the source predicate of the instruction are checked in process block 330. Alternatively, the "oldest" instruction (i.e. the instruction that was issued to the temporary result buffer first) is checked first and less aged instructions are checked in order of age. The scoreboard is queried to determine if the source predicate is ready or available. If the source predicate is not available, then the temporary result buffer is not updated (i.e. updates are stalled) in process block 330. Next, the source predicate is tested to determine if the source predicate is true in process block 332. If the source predicate is true, then the result of the instruction is written to the register file in process block 334. If the source predicate is not true in process block 332, then the result of the instruction is discarded in process block 336 and the scoreboard entry for the instruction is cleared in process block 338. The entry in the temporary result buffer for the instruction is also cleared in process block 340.

Figures 4A, 4B:
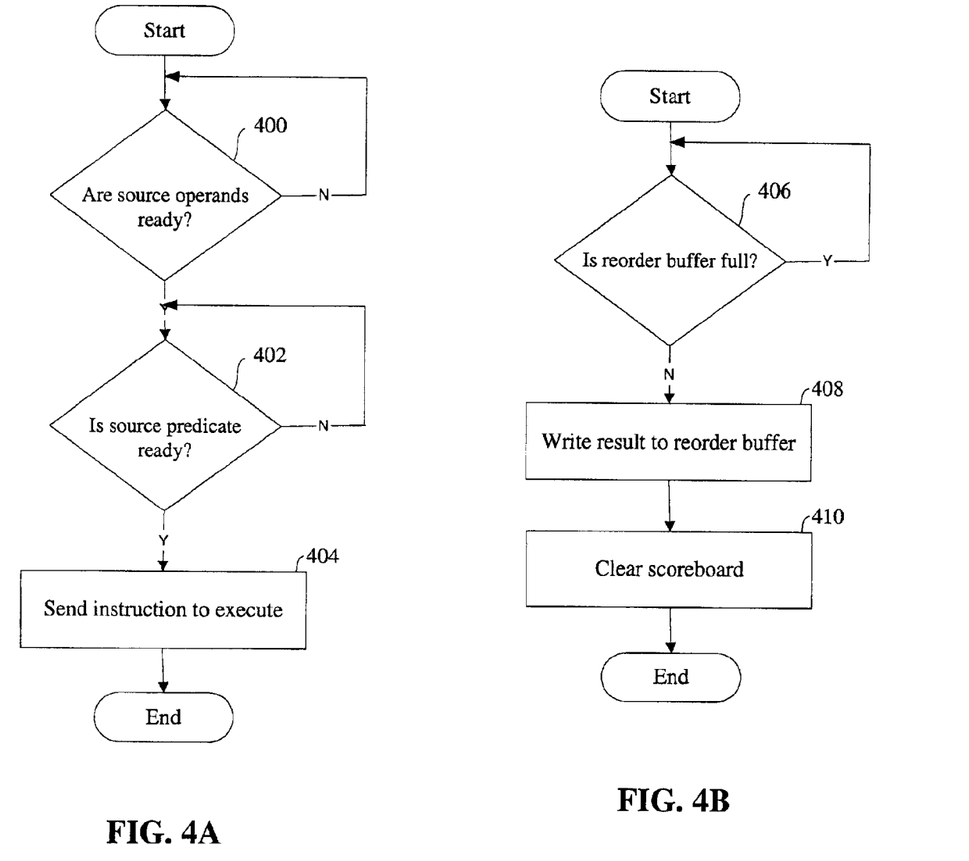
FIGS. 4A–4C illustrate a standard out-of-order CPU algorithm of one embodiment.
Figure 4C:
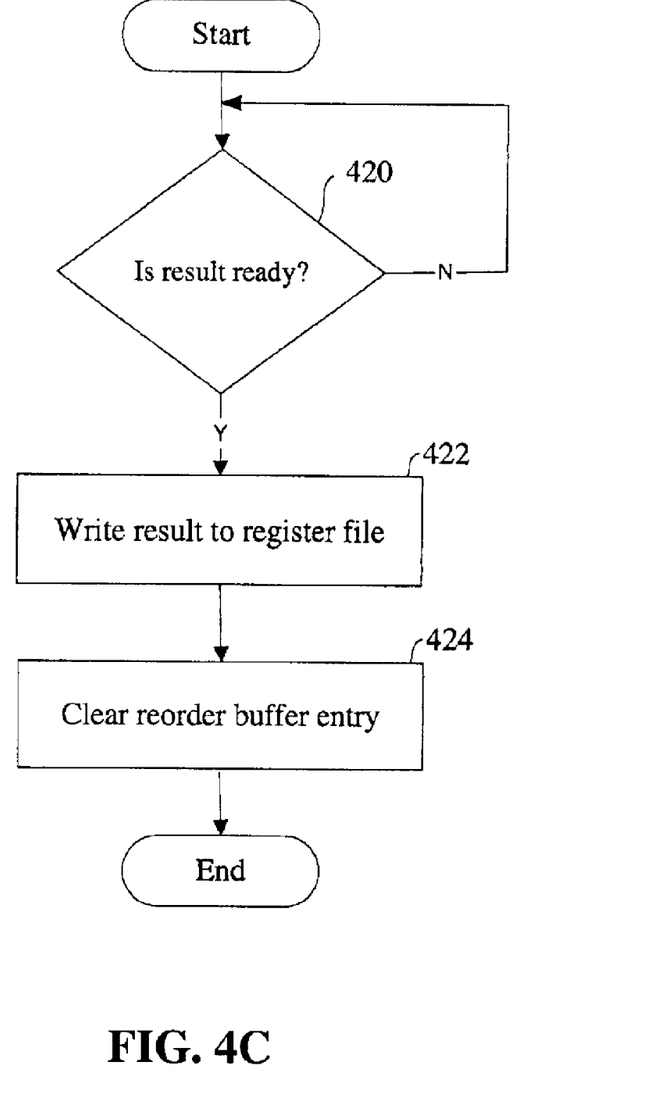

FIGS. 4A–4C illustrate a standard out-of-order CPU algorithm of one embodiment. First, FIG. 4A shows the transition from issue stage to execution stage. For each instruction in the issue stage, checking the scoreboard for the status of the source operands checks the source operands for availability in process block 400. If the source operands are not ready, then the pipeline is stalled until all of the source operands are available. If the source operands are ready (available) then the source predicate is checked for availability in process block 402. If the predicate is not available, then the pipeline is stalled until the predicate is available. When the predicate is available, the instruction is issued to the execution stage in process block 404.

FIG. 4B shows the transition from execution stage to retiring the instruction. The result of the executed instruction is written back to the reorder buffer in process block 408. The reorder buffer can later retire the instruction in order. Alternatively, the reorder buffer can be checked to determine if the reorder buffer is full in process lock 406 before the result of the instruction is written back to the reorder buffer. If reorder buffer is full then the pipeline is stalled until the reorder buffer is no longer full. Once the result is in the reorder buffer, the status of the instruction is cleared from the scoreboard in process block 410.

FIG. 4C shows the processing of the instruction in the reorder buffer. If the result of the instruction is not ready in process block 420, then the update of the reorder buffer is stalled until the result is ready. If the result of the instruction is ready in process block 420, then the result is written to the register file in process block 422 and the entry in the reorder buffer is cleared in process block 424.

Figure 5A:
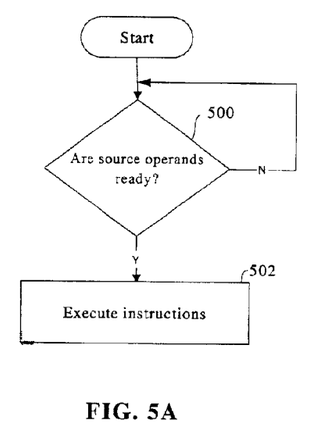
FIGS. 5A–5C illustrate a limited predicate slip out-of-order CPU algorithm of one embodiment.
Figure 5B:
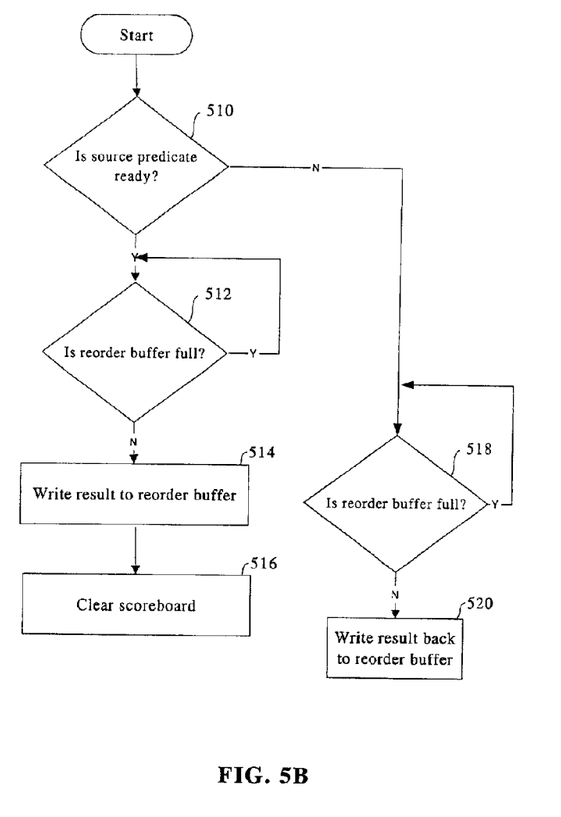
Figure 5C:
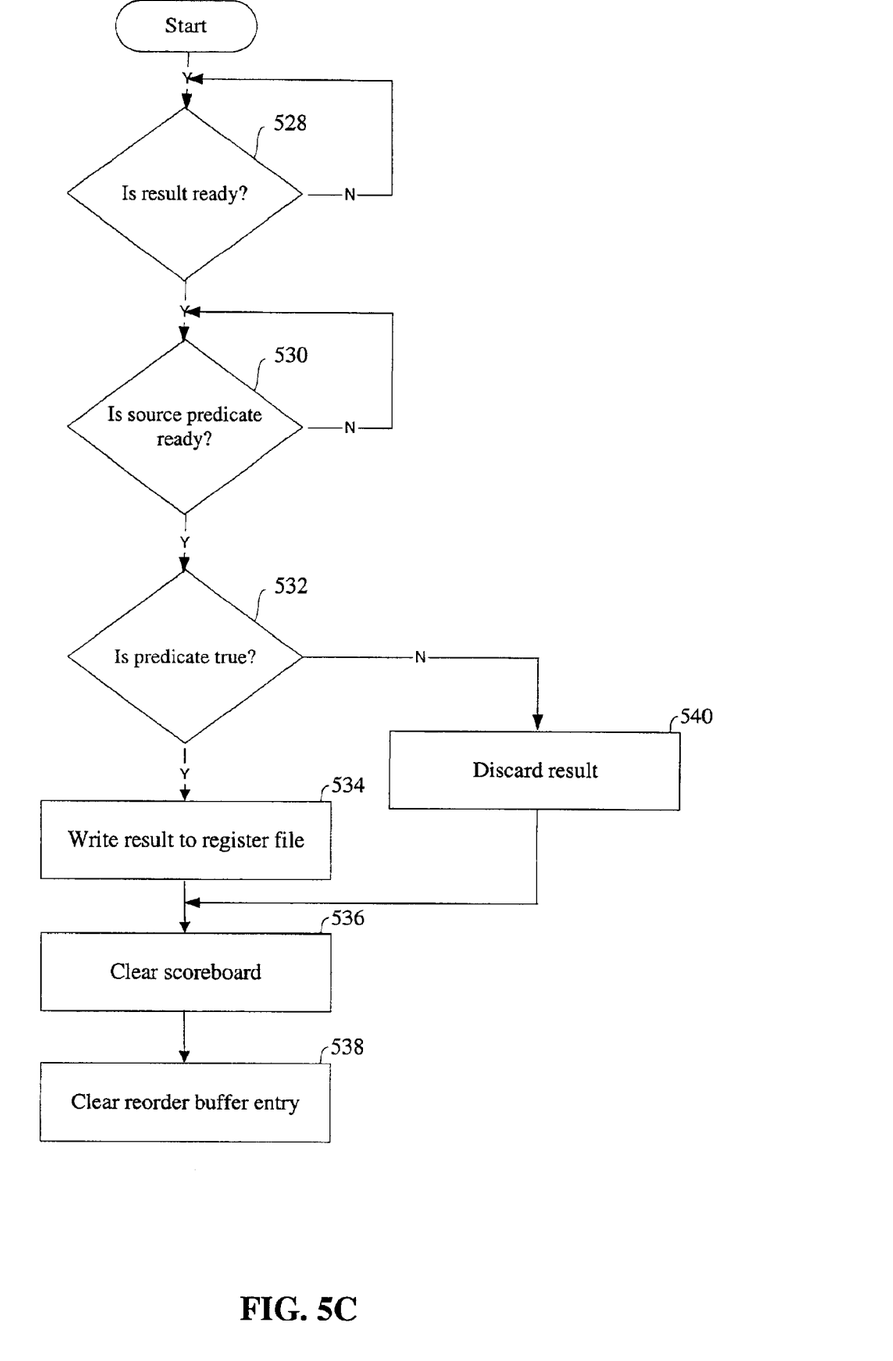

FIGS. 5A–5C illustrate a limited predicate slip out-of-order CPU of one embodiment. FIG. 5A illustrates the transition from issue to execution of one embodiment. For each instruction in the issue stage, the availability of the source operands of the instruction are checked in process block 500. Alternatively, the "oldest" instruction (i.e. the instruction that was issued to the register read stage first) is checked first and less aged instructions are checked in order of age. The scoreboard is queried to determine if the source operands are ready or available. If any one of the source operands are not available, then the pipeline is stalled until all of the source operands are available. If all of the source operands are available, then the instruction can be advanced to the execution stage in process block 502.

FIG. 5B shows the transition from execution to retiring the instruction in a limited predicate slip, out-of-order CPU of one embodiment. The source predicate is checked for availability in process block 510. If the predicate is available, then the result of the instruction is transferred to the reorder buffer in process block 514. Alternatively, the reorder buffer can also be checked to determine if the reorder buffer is full, before the result is transferred to the reorder buffer in process block 512. Once the result of the instruction is transferred to the reorder buffer, the status entry for the instruction is cleared from the scoreboard in process block 516.

FIG. 5C shows one embodiment of processing the instruction in the reorder buffer in a limited predicate slip, out-of-order CPU. For each entry in reorder buffer, processed in order, the result of the instruction is checked for availability in process block 528. If the result is not ready, then the update of the reorder buffer is stalled until the result is ready. If the result is ready, the source predicate is checked for availability in process block 530. If the source predicate is not ready, then the update of the reorder buffer is stalled until the source predicate is ready. If the source predicate is ready, then the predicate whether the predicate is true or not is determined in process block 532. If the predicate is true, then the result of the instruction is written to the register file in block 534. The scoreboard is then cleared in process block 536 and the reorder buffer entry for the instruction is cleared in process block 538. If the predicate is false (not true) in process block 532, the result of the instruction is discarded in process block 540 and the scoreboard is then cleared in process block 536 and the reorder buffer entry for the instruction is cleared in process block 538.

It will be further appreciated that the processes represented by the blocks in FIGS. 3A–5C are not required to be performed in the order illustrated, and that all the processing represented by the blocks may not be necessary to practice the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    dispatching a predicate instruction for execution before a predicate of the predicate instruction is resolved;
    dispatching subsequent instructions for execution before the predicate is resolved; and
    stalling dispatch of a consumer instruction of the predicate instruction if the predicate remains unresolved.

2. The method of claim 1 further comprising executing the predicate instruction and storing a result of the executed predicate instruction in a buffer in a writeback path if the predicate of the predicate instruction is unresolved.

3. The method of claim 2 further comprising:
    resolving the predicate;
    writing the result to an architectural register file if the predicate has a predicate value of true, and discarding the result if the predicate value is false; and
    updating a scoreboard with a resolved status for the predicated instruction.

4. The method of claim 1 further comprising dispatching the consumer instruction when the predicate of the predicate instruction is resolved.

5. The method of claim 4 further comprising checking a scoreboard to determine if the predicate of the predicate instruction is resolved.

6. An apparatus comprising:
    means for dispatching a predicate instruction for execution before a predicate of the predicate instruction is resolved;
    means for dispatching subsequent instructions for execution before the predicate is resolved; and
    means for stalling dispatch of a consumer instruction of the predicate instruction if the predicate remains unresolved.

7. The apparatus of claim 6 further comprising means for executing the predicate instruction and storing a result of the executed predicate instruction in a buffer in a writeback path if the predicate of the predicate instruction is unresolved.

8. The apparatus of claim 7 further comprising:
    means for resolving the predicate;
    means for writing the result to an architectural register file if the predicate has a predicate value of true, and discarding the result if the predicate value is false; and
    means for updating a scoreboard with a resolved status for the predicated instruction.

9. The apparatus of claim 6 further comprising means for dispatching the consumer instruction when the predicate of the predicate instruction is resolved.

10. The apparatus of claim 9 further comprising means for checking a scoreboard to determine if the predicate of the predicate instruction is resolved.

11. An apparatus comprising:
    an instruction pipeline with a plurality of pipeline stages wherein:
        a predicate instruction is dispatched for execution within the pipeline before a predicate of the predicate instruction is resolved;
        subsequent instructions are dispatched for execution within the pipeline before the predicate is resolved; and
        a consumer instruction of the predicate instruction is stalled from dispatching if the predicate remains unresolved;
    a register file coupled to the pipeline;
    a buffer coupled to the register file and coupled to a writeback stage of the pipeline, the buffer to store predicate instructions that have been executed and contain an unresolved predicate;
    a scoreboard coupled to the register file, the scoreboard to track the status of instructions within the pipeline.

12. The apparatus of claim 11 wherein the buffer is an associative buffer coupled to a writeback path of the processor.

13. The apparatus of claim 11 wherein the buffer is a reorder buffer.

14. The apparatus of claim 11 wherein the status of instructions within the pipeline includes the resolved status of predicates for predicated instructions.

15. An apparatus comprising an instruction pipeline with a plurality of pipeline stages wherein:
    a predicate instruction is dispatched for execution within the pipeline before a predicate of the predicate instruction is resolved;
    subsequent instructions are dispatched for execution within the pipeline before the predicate is resolved; and a consumer instruction of the predicate instruction is stalled from dispatching if the predicate remains unresolved.

16. A system comprising:
a processor, the processor to
   dispatch a predicate instruction for execution before a predicate of the predicate instruction is resolved;
   dispatch subsequent instructions for execution before the predicate is resolved; and
   stall dispatch of a consumer instruction of the predicate instruction if the predicate remains unresolved; and
one of an audio input device or an audio output device coupled to the processor.

17. The system of claim 16, wherein the processor comprises a scoreboard, the scoreboard to track the status of instructions within the processor.

18. The system of claim 16, wherein the processor comprises a buffer, the buffer to store predicate instructions that have been executed and contain an unresolved predicate.

* * * * *